United States Patent [19]

Asano

[11] 3,912,078

[45] Oct. 14, 1975

[54] FILM CASSETTE

[75] Inventor: Yoshio Asano, Hyogo, Japan

[73] Assignee: Fuji Photo Film Co., Ltd., Minami-ashigara, Japan

[22] Filed: Dec. 20, 1973

[21] Appl. No.: 426,755

[30] Foreign Application Priority Data

Dec. 23, 1972 Japan .................................. 48-1417

[52] U.S. Cl. ................. 206/455; 206/316; 354/181

[51] Int. Cl.[2] .................... B65D 85/48; B65D 85/38

[58] Field of Search ........................... 354/180–184, 354/275, 276, 281; 96/76 C; 206/316, 454–456, 39.4

[56] References Cited

UNITED STATES PATENTS

| | | | |
|---|---|---|---|
| 3,091,327 | 5/1963 | Lallet | 206/455 |
| 3,595,661 | 7/1971 | Gold | 96/76 C |
| 3,710,977 | 1/1973 | Van Den Enden et al. | 206/455 |
| 3,779,770 | 12/1973 | Alston et al. | 96/76 C |

*Primary Examiner*—William I. Price
*Assistant Examiner*—Douglas B. Farrow
*Attorney, Agent, or Firm*—Sughrue, Rothwell, Mion, Zinn & Macpeak

[57] ABSTRACT

A film cassette holding a required number of monosheets may protect monosheets contained therein from impact and exposure to light, and has a built-in means for urging monosheets into a camera. Upon insertion of the cassette into a camera, the cassette is automatically opened, and monosheets are automatically loaded, in light proof conditions, from the film cassette into the camera, which is provided with a means for advancing successive monosheets to an exposure position, and the cassette is then withdrawn, the camera being automatically sealed upon withdrawal of the cassette.

9 Claims, 39 Drawing Figures

1b
1d
1c
1f
4
13a
2
3
13b
S
13
1
1a
3
13a
1e
13b
4
1f 1b
1d
1c
1f
4
13a
2
3
13b
S
13
1
3
1a
13a
1e
13b
1f
4

8
7
9
6
5
3a
3

MS
1c

MS2
10'
10
12
11
MS1

FIG. 15
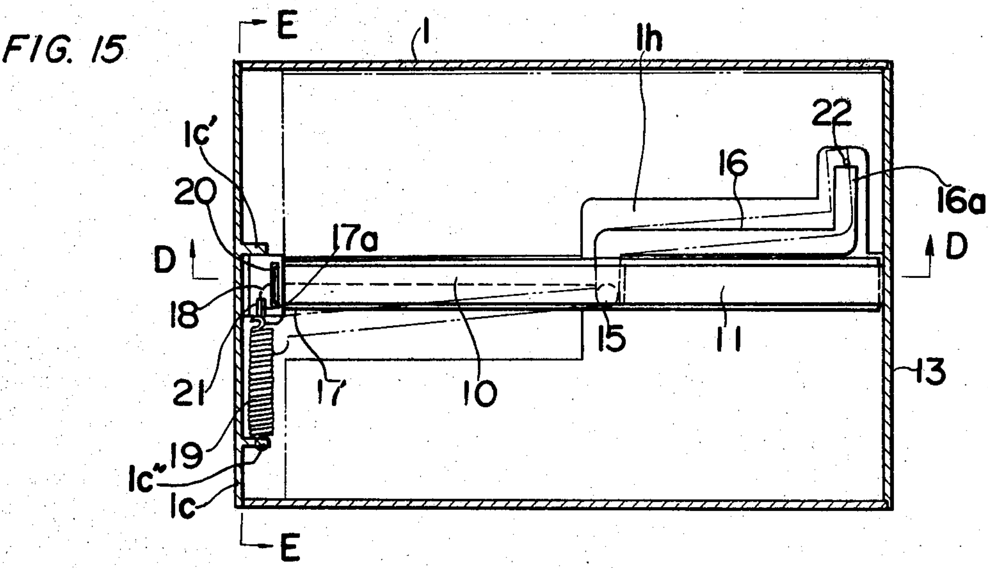
FIG. 16
FIG. 17
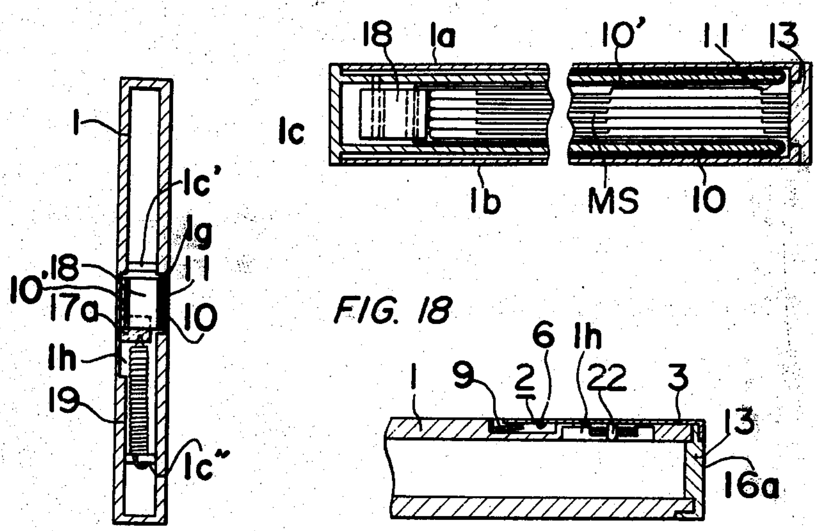
FIG. 19
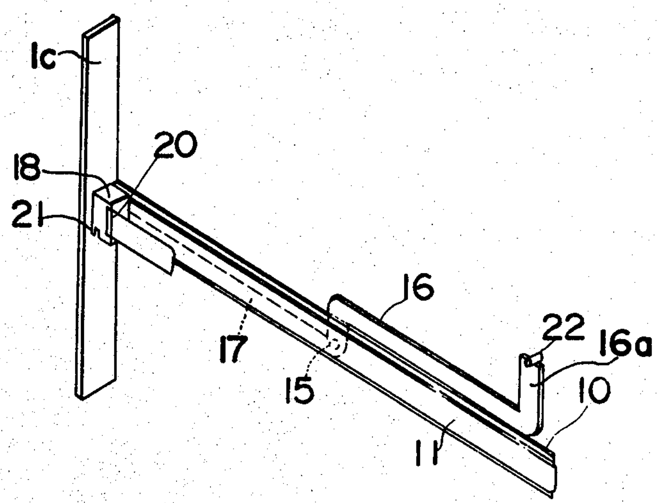

FIG. 28
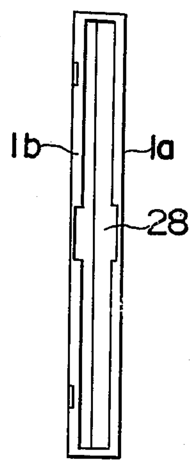
FIG. 29
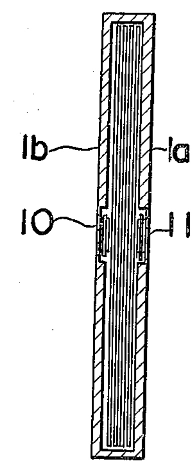
FIG. 30
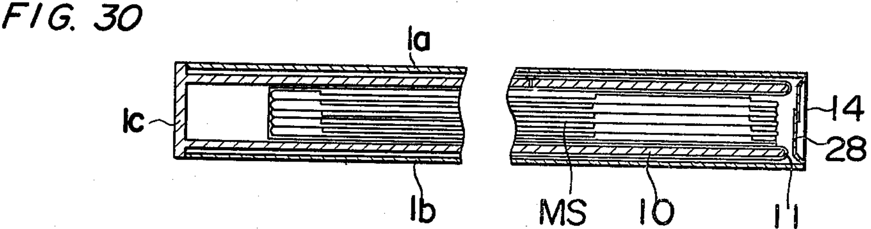
FIG. 31
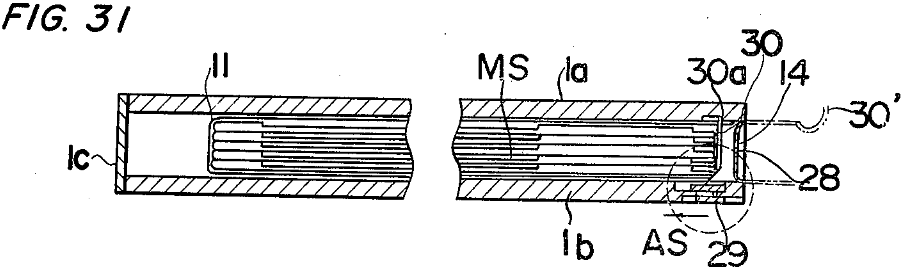
FIG. 32
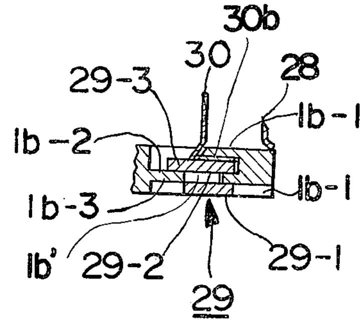
FIG. 31a

FILM CASSETTE

The present invention relates to a film cassette, and more particularly to a film cassette making possible the automatic insertion of a required number of monosheets into a camera.

There has recently been developed a type of photographic film which is a combination of a negative film, positive film, container holding a solution of processing and developing chemicals. This type of film is used in conjunction with a special type of camera, popularly termed an auto-process camera, and permits a positive image of an object to be obtained on the positive film portion almost immediately after exposure of the negative film portion to light reflected from the object. This type of film goes under a variety of popular and trade names, such as monosheet, auto-print, or film-sheet. For the purposes of the present description, this type of film will be referred to as monosheet.

While the development of this type of camera and film has represented on outstanding advance in the photographic industry, there have been certain problems associated therewith, which have hiterto been unresolved. A principal problem has been the provision of a means for advancing successive monosheets loaded into a camera to a position in which they may be exposed. It has been known conventionally to provide a cassette, or pack, which contains separated monosheets, or successively connected monosheets, and which has a built-in means for advancing successive monosheets to a position for exposure, within an auto-process camera. Such conventional cassettes, or packs, have the disadvantages that the built-in advance means increases the bulk and weight thereof, which is an inconvenience when a photographer wishes to carry a large supply of films. Also, a correspondingly bulky camera is required to hold such conventional cassettes, or packs, which makes it correspondingly difficult for a photographer to manipulate the camera with sufficient case to exercise his or her photographic skill to the full. Another disadvantage associated with conventional monosheet cassettes, or packs, and the auto-process cameras used in conjunction thereiwth, has been that it has been possible to load only a full complement of monosheets into a camera. With conventional means, therefore, when it is wished to take a large number of shots, a first cassette or pack is inserted in the camera, the monosheets contained therein are exposed, and removed from the camera, the first cassette or pack, is ejected, and then another cassette, or pack, is inserted into the camera. However, when there are only 2 – 3 unexposed monosheets still available in a camera, it may not infrequently be required to take 5 – 6 shots in rapid succession. In this situation, this conventional means, a photographer must either renounce taking the required number of shots, or must eject the cassette, or pack, containing the 2 – 3 remaining monosheets, which are thereby wasted, and then insert a full, new cassette, or pack.

it is accordingly an object of the present invention to provide an improved film cassette.

It is another object of the invention to provide a lighter and less bulky film cassette. It it a further object of the invention to provide a film cassette which may load monosheets into a camera and then be removed, whereby the weight of the cassette is not added to that of the camera, and manipulation of the latter is facilitated.

It is yet another object of the invention to provide a film cassette which permits loading of a supplementary number of monosheets into a camera without requiring any structural modifications of the camera.

In accompanying these, and other objects, there has been provided, according to the present invention, a film cassette holding a required number of monosheets, which is suitably half or less than half the full complement of monosheets containable in an associated camera. The film cassette is suitably made of plastic, or other material which may protect monosheets contained therein from impact and exposure to light, and has a built-in means for urging monosheets into a camera. Upon insertion of the cassette into a camera, the cassette is automatically opened, and monosheets are automaticaloy loaded, in the light proof conditions, from the film cassette into the camera, which is provided with a means for advancing successive monosheets to an exposure position, and the cassette is then withdrawn, the camera being automatically sealed upon withdrawal of the cassette.

These and other objects and features of the present invention will become apparent from the following description taken in conjunction with preferred embodiments thereof with reference to the accompanying drawings, in which:

FIG. 1 is an external perspective view of a film cassette according to a first embodiment of the present invention, FIG. 2 is a detail view of a catch means employed in the film cassette of FIG. 1, FIG. 3 is an internal perspective view of the film cassette, of FIG. 1, FIG. 4 is a cross-sectional side view of the film cassette of FIG. 1, FIG. 5 is a cross-sectional view, on an enlarged scale, taken through the line A—A of FIG. 4, FIG. 6 is a cross-sectional view taken through the line B—B of FIG. 4, FIG. 6*a* is an enlarged view of a portion of the cassette of FIG. 6, FIG. 7 is a side view of the catch means employed in the film cassette of FIG. 1, FIG. 8 is a top plan view of the catch means shown in FIG. 7, FIG. 9 is a cross-sectional view of a camera used in association with the film cassette of the invention, FIG. 9*a* is an enlarged view of the projection of the camera of FIG. 9, FIG. 10 is a cross-sectional view taken through the line C — C of FIG. 9, FIGS. 11 to 14 illustrate the catch means release action of FIG. 7, and insertion of monosheets into the camera shown in FIG. 9, respectively, FIG. 15 is a cross-sectional view of a film cassette according to a second embodiment of the invention, FIG. 16 is a cross-sectional view taken through the line D—D of FIG. 15, FIG. 17 is a cross-sectional view, on an enlarged scale, taken through the line E—E of FIG. 15, FIG. 18 is a cross-sectional view of a catch means employed in the film cassette of FIG. 15, FIGS. 19, and 20 are perspective views of an elastic means suspension element employed in the film cassette of FIG. 15, FIG. 21 is a cross-sectional view of a film cassette according to a third embodiment of the invention.

FIG. 28 is a cross-sectional view taken through the line H—H of FIG. 27,

FIG. 29 is a cross-sectional view taken through the line I—I of FIG. 27,

FIG. 30 is a cross-sectional view taken through the line J—J of FIG. 27,

FIG. 31 is a cross-sectional view taken through the line K—K of FIG. 27,

Figure 26:
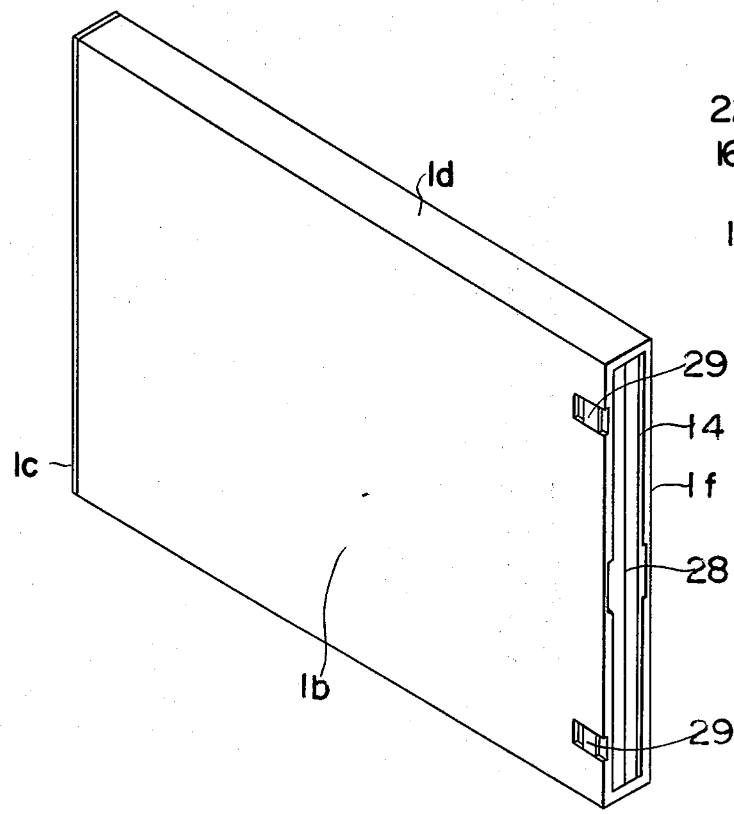
FIG. 26 is a perspective view of a film cassette according to a fifth embodiment of the invention.
Figure 33:
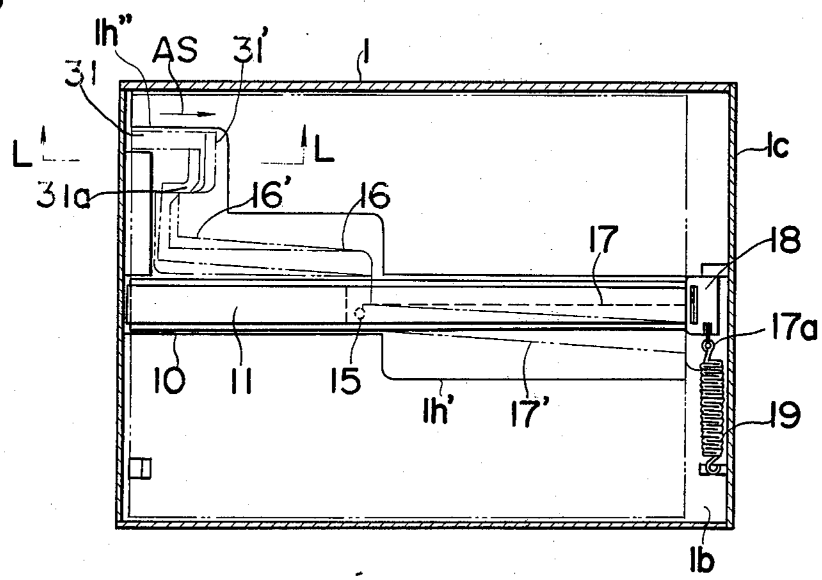
Figure 35:
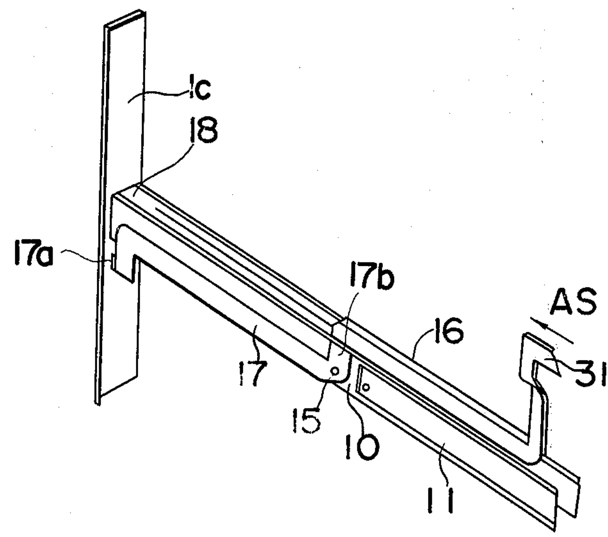
Figure 34:
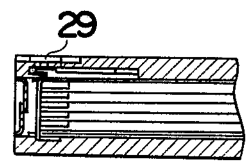
Figure 36:
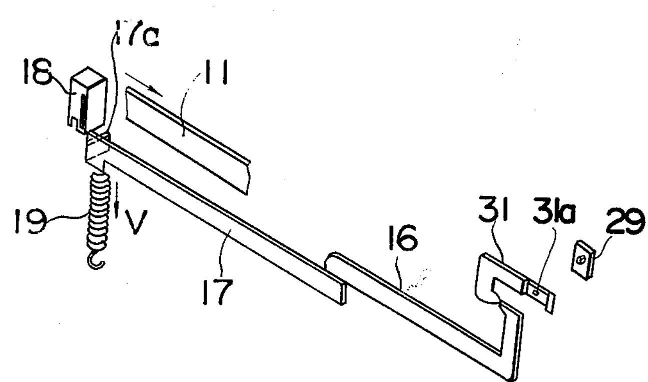

FIG. 31*a* is an enlarged view of a portion of the cassette of FIG. 31,

FIG. 32 is a cross-sectional end view of a retaining means employed in the film cassette of FIG. 26, FIG. 33 is a longitudinal cross-sectional view of a film cassette according to a 6th embodiment of the invention, FIG. 34 is a cross-sectional view, on an enlarged scale, taken through the line L-L of FIG. 33, and FIGS. 35 and 36 are perspective views showing main parts of a suspension element withholding means employed in the film cassette of FIG. 33. de Before proceeding with the description, it is to be noted that, throughout the several attached drawings, like numerals refer to like parts. It is also to be noted that, for the purposes of the description, terms such as forward, back, right, or left are to be taken as being in reference to a normally upright camera and to a film cassette in position for loading monosheets thereinto, and the terms clockwise and anticlockwise are to be taken to mean as seen by a person looking down on a normally upright camera or a film cassette in position for loading.

Figure 1:
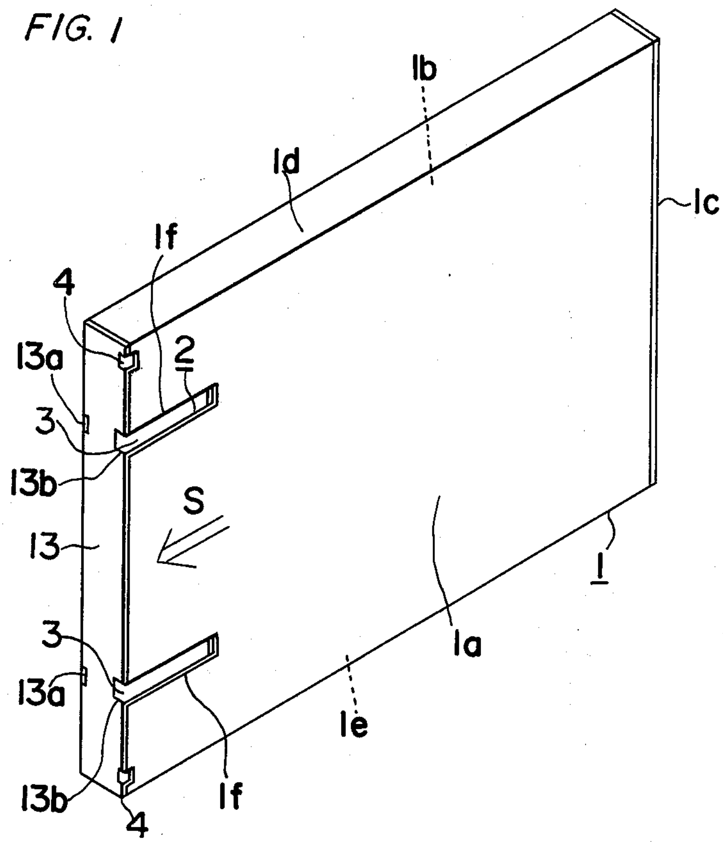

In FIG. 1 there is shown a monosheet cassette 1, according to a 1st embodiment of the present invention, which has a general outward appearance of a flat, rectangular plate-like case. The cassette 1 is made of any suitably rigid lightproof material, such as plastic, and comprises large front and back walls 1*a*, 1*b*, a narrow left-hand end wall 1*c*, and narrow top and bottom walls 1*d*, 1*e*, which constitute a rigid outer cover for monosheets MS. The right-hand end of the cassette 1, that is the end thereof that is first inserted into a camera C, constitutes a swing door 13, which, when closed, completely covers the right-hand end of the cassette 1. When the door 13 is closed, monosheets MS in the cassette 1 are completely protected from light. The door 13 is pivotally mounted on hinges 13*a*, which are fixed to the right-hand end of the cassette back wall 1*b*, whereby the door 13 may be swung clockwise, to open the right-hand end of the cassette 1, and permit extrusion of monosheets MS therethrough, as described in further detail below. The door 13 is normally held closed by catches 2, which are disposed at the right-hand end of the cassette front wall 1*a*.

Figure 2:
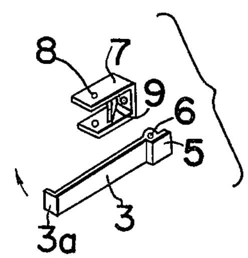
Figure 7:
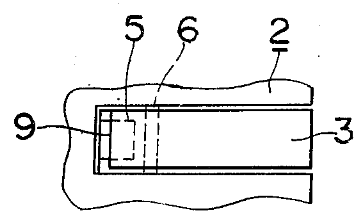
Figure 8:
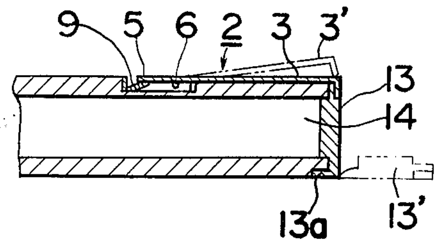

As shown in FIGS. 2, 7 and 8, each catch 2 comprises a flat, lever 3, which has a hooked end 3*a*, and which is pivotally mounted in a bracket 7. The bracket 7 is an integral unit comprising parallel top and bottom portions which are adjointed to a vertical end portion. The backet vertical end portion is at the left-hand end of the bracket 7. The bracket 7 fits into a recessed portion if in the cassette front wall 1*a*, and no part thereof projects beyond the front of the front wall 1*a*. The lever hooked end 3*a* is a short portion which is formed at right-angles to the main body of the lever 3, at the right-hand end thereof. Near the left-hand end of the lever 3, and at the top and bottom thereof, there are formed pins 6, which are pivotally mounted in holes 8, which are formed at generally central points in the upper and lower portions of the bracket 7. The portion of the lever 3 to the left of the pins 6 constitutes a lever left-hand portion 5, which may be accommodated in that part of the bracket 7 lying to the left of the holes 8. One end of a plate spring 9 is fixedly attached to the bracket vertical end portion, and the other end thereof contacts the lever left-hand portion 5. The plate spring 9 provided in each catch 2 exerts a constant pressure acting to cause the lever 3 to turn clockwise, whereby the lever 3 is held flat in grooves fromed in the cassette front wall 1*a*, and the hooked end 3*a* thereof hooks onto the front edge of the swing door 13, whereby the door 13 is held closed. In the door 13 there may be optionally formed small grooves 13*b*, into which the lever ends 3*a* fit.

Figure 3:
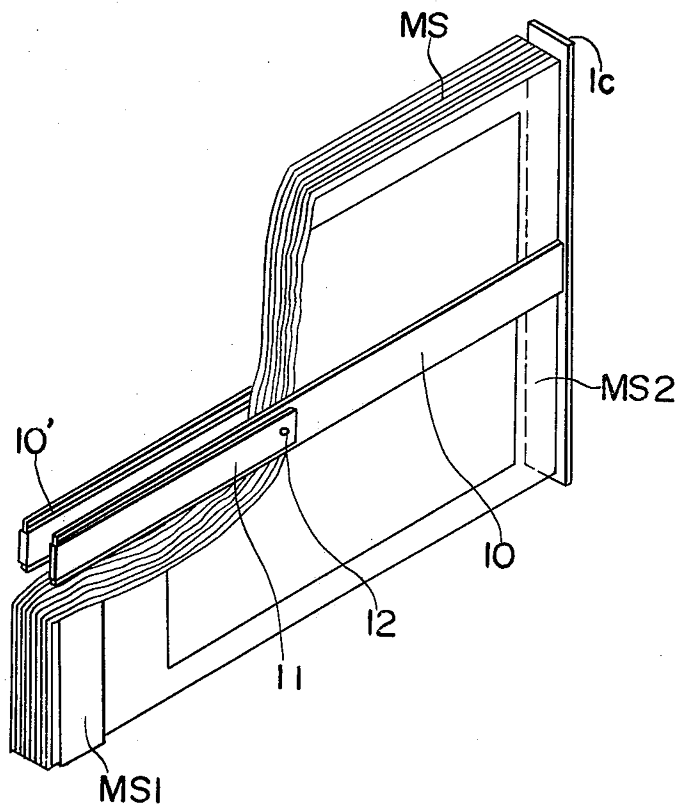
Figure 4:
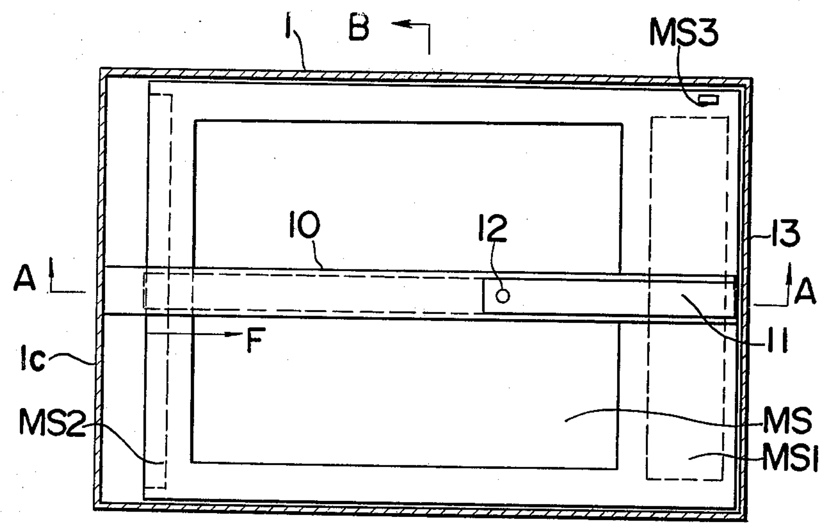

Referring now to FIGS. 3, 4, each monosheet MS, contained in the cassette 1, is formed as an integral unit comprising a front; exposure film surface, which is the film-sheet surface to be exposed to light reflected from external objects and directed through a camera lens, a rear positive image surface (not shown in the drawing), a sac MS1, provided at the right-hand (leading) edge of the monosheet MS, and containing a suitable processing and developing solution, a broad MS2, provided at the left-hand end of the monosheet MS, for the removal of excess processing and developing solution, and small engagement holes MS3, which are formed on the front of the monosheet MS, near the upper and lower right-hand corners thereof, and are may by engaged by pawls provided in the camera C, whereby the monosheet MS may be removed from the camera C after exposure.

Figure 5:
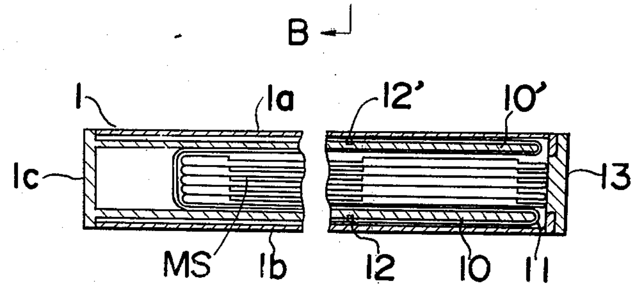
Figure 6:
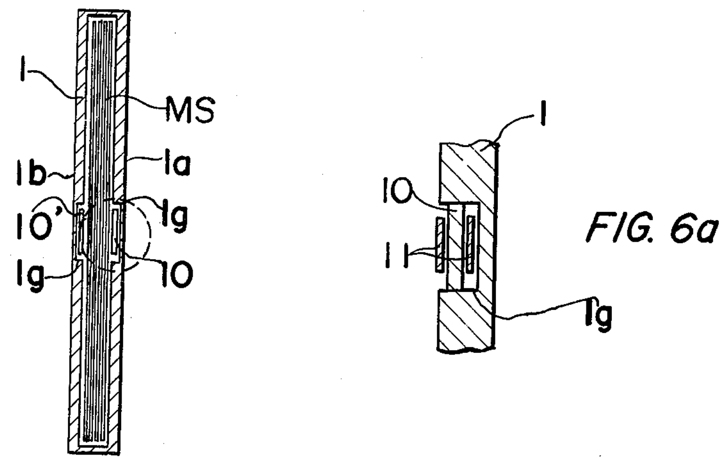

On the inner sides of the cassette front and back walls 1*a*, 1*b*, there are formed grooves 1*g*, each of which lies in a generally central portion of the corresponding wall, 1*a* or 1*b*, extends from the cassette left-hand wall 1c to the vicinity of the door 13, and is generally parallel to the longitudinal axis of the cassette 1. Rigid support arms 10, 10' are contained, and lie flat within the grooves 1*g* formed in the front and back walls 1*a*, 1*b*, respectively. Each support arm 10, 10' is fixedly attached at one end to the cassette left-hand wall 1*c*, and extends to the vicinity of the door 13. Monosheets MS in the cassette 1 is lie between the support arms 10, 10'. One end of a broad rubber band 11 is fixedly attached by a pin 12 to a generally central point on the front side of the support arm 10, and the other end thereof is fixedly attached by a pin 12' to a generally central point on the rear side of the support arm 10'. The rubber band 11 is stretched from the pin 12 to the righthand end of the support arm 10, around the right-hand end of the support arm 10, along the rear side of the support arm 10, around the left-hand edge of the monosheets MS in the cassette 1 (that is around the boards MS2), along the front side of the support arm 10', to and around the right-hand end of the support arm 10', and to the pin 12'. The rubber band 11 is generally contained within the grooves fromed in the cassette front and back wall 1*a*, 1*b*, as shown in FIG. 5, 6, and does not apply pressure to the sides of the monosheets MS, but exerts a constant force on the boards MS2 to urge the monosheets MS en bloc rightwards, out of the cassette 1. The monosheets MS are, however, normally prevented from leaving the cassette 1 by the door 13, which is held closed by the catches 2. Small notches 4 are formed in the front wall 1*a*, at the right-hand edge thereof, and near the upper and lower right-hand corners thereof. The notches 4 are engaged by stoppers C107, provided in the camera C, insertion of the cassette 1 into the camera C, as described below.

Figure 9:
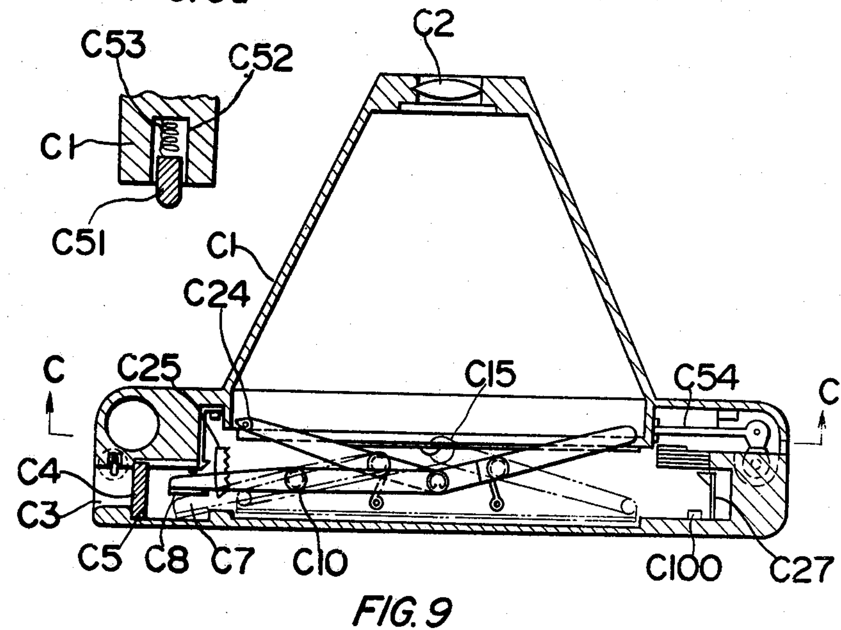
Figure 10:
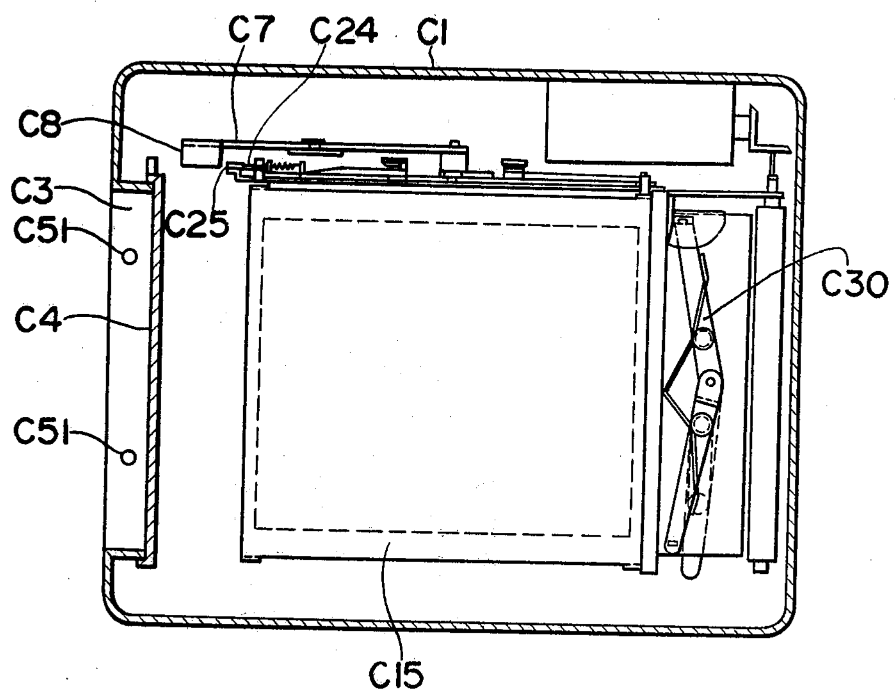

FIGS. 9, 9*a*, 10 show the camera C, with which the monosheet cassette 1 of the present invention is associated. The camera C may be seen to be of the type disclosed in U.S. Pat. application Ser. No. 413,306 filed Nov. 6, 1973, by Yoshio Asano and entitled AUTO PROCESS CAMERA, assigned to the present assignee. The camera C comprises an entrance or opening C3, which is provided at the left-hand side of the camera C, and is normally sealed by a spring-loaded door C4, and a pressure plate C15, which moves successive monosheets MS, that have been loaded into the camera C, to a foremost exposure positioning frame and which is actuated by a toggle assembly C7 – C10. Each successive monosheet MS is removed, after exposure thereof, by a pair of levers C30, which are provided at the right-hand side of the interior of the camera C, and which posses pawls of the engagement of the abovementioned monosheet engagement holes MS3. As each monosheet is removed by the levers C30, the toggle assembly C7 – C10 urges the pressure plate C15 forwards, the pressure plate C15 pushes the remaining monosheets MS forward, and a next foremost monosheet is brought to the exposure positioning frame. When the door C4 is opened, the toggle assembly C7 – C10 is actuated to withdraw the pressure plate C15 to a rearmost position, to permit insertion of monosheets MS into the camera C. Constraints are imposed on rearward movement of the toggle assembly C7 – C10 by a rotatably mounted pawl C24 and rack C25. When more than a certain number of monosheets MS, for example five, are present in the camera C, the combined thickness of the monosheets MS hold the pressure plate C15 at a certain distance from the abovementioned exposure positioning frame, whereby the toggle assembly C7 – C10 is brought into a configuration in which the pawl C24 engages the rack C25, and the toggle assembly C7 – C10 may act to move the pressure plate C15 forwards, but may not act to move the pressure plate rearwards, and the door C4 may not therefore be opened. In other words, successive foremost monosheets MS may be brought to the exposure positioning frame, after exposure of preceeding monosheets MS, but it is not possible to load fresh monosheets into the camera C until the number of unexposed monosheets MS remaining therein is less than a certain set number. A photographer may therefore know when there is more than a set number of monosheets remaining in the camera C, this set number is the number of shots a photographer might normally anticipate taking in rapid succession.

The entrance C3 dimensions match the height and width dimensions of the cassette 1, whereby the right-hand end of the cassette 1 may fit exactly into the entrance C3, and ensure exclusion of light therethrough.

Figure 11:
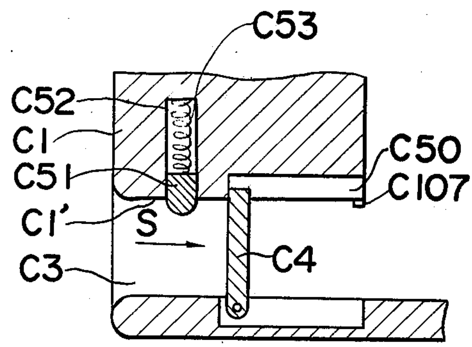

As shown in FIG. 11, in the interior of the camera C, recessed portions C50 are formed in the inward extension C1' of the front wall C1 of the entrance C3, that is the extension lying to the right of the door C4, which normally closed the inner end of the entrance C3. These recessed portions C50 lie level with catches 2 on the cassette 1, when the cassette 1 is inserted in the entrance C3, and permit the levers ends 3*a* to be moved forwards, as described in further detail below. The abovementioned stoppers C107, which engage the notches 4 of the cassette 1, are provided near the top and bottom of the front wall inward extension C1', and at the right-hand end thereof.

In the front C1 of the entrance C3 there are formed holes C52, which are in line with the recessed portions C50. Each hole C52 accommodates an extension spring C53, one end of which spring C53 is fixedly attached to the base of the hole C52, and the other end of which is fixedly attached to a pin C51. The pins C51 are round-headed and normally project slightly from holes C52 rearwards with respect to the front wall C3, due to the extension of their respective springs C53.

Figure 12:
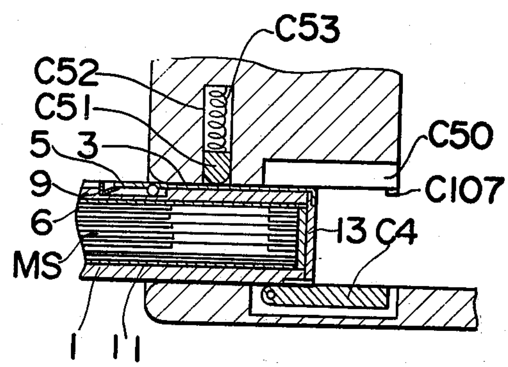
Figure 13:
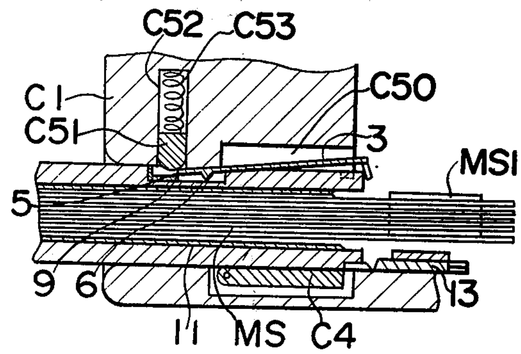
Figure 14:
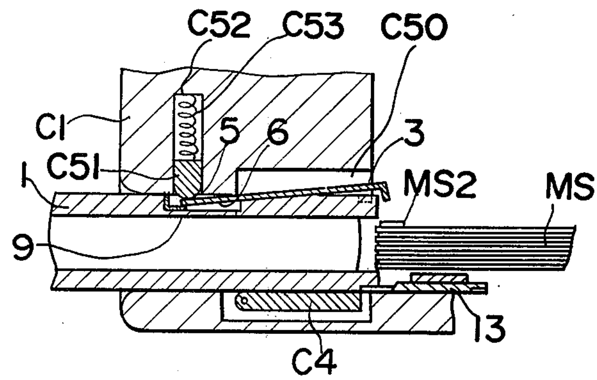

Referring now to FIGS. 12 – 14, presuming that there are no monosheets MS in the camera C, or that there is less than a certain set number of remaining monosheets MS to load a required number of monosheets MS into the camera C, the right-hand end of the cassette is inserted in the entrance C3, and the cassette 1 is pushed rightwards, towards the interior of the camera C. As the cassette 1 is moved rightwards, the front wall 1a thereof rides on the round-headed pins C51, and pushes the pin C51 into the holes C52, counter to the forces of the springs C53. As the cassette 1 advances further rightwards the right-hand end thereof pushes against and opens the abovementioned door C4, as shown in FIg. 12. Although the door C4 is opened, no light enters the camera C through the entrance C3, since, as described earlier, the cassette 1 fits exactly into the entrance C3. When opened, the door C4 actuates the toggle assembly C7 – C10 thus causing the pressure plate C15 to be drawn to rearmost position, to permit subsequent insertion of monosheets MS into the interior of the camera C. The cassette 1 may be moved rightwards until the stoppers C107, provided at the end of the entrance front wall extension C1', come into contact with the left-hand ends of the notches 4 in the front of the cassette 1. The distance from the rear portions 5 of the cassette catch levers 3 to the right-hand edge of the cassette 1 is equal to, or slightly less than the distance from the holes C52 in the entrance front wall to the stoppers C107. Therefore, at the same time as, or slightly before the cassette 1 is stopped by the stoppers C107, the lever end portions 5 come to the locations of the pins C51. The extension spring C52 now pushes the pins C51 outwards from the holes C52, in opposition to the force of the plate spring 9. The lever ends 5 are pushed, by the pins C51, into the open portions of the brackets 7, the levers 3 are pivoted anticlockwise about the pins 6, and the lever ends 3a are moved out of contact with the cassette swing door 13, as shown in FIG. 13. The force of the rubber band 11, urging the monosheets MS in the cassette 1 rightwards, is now no longer opposed. Therefore the door 13 is swung clockwise, and open, and the monosheets MS are moved en bloc from the cassette 1 into the interior of the camera C, as shown in FIG. 14. When the cassette 1 is withdrawn, the monosheets MS are left in the camera C, and the spring-loaded door C4 is closed before the cassette 1 is completely removed from the entrance C3. In other words, a required number of monosheets MS may be easily and rapidly loaded in light-proof conditions.

In FIGS. 15 to 20 there is shown a second embodiment of the invention which is similar to the first embodiment in many respects, but differs therefrorm in that the force of the rubber band 11 is not applied on monosheets MS in the cassette 1, prior to insertion of the monosheets MS into the camera C.

In this second embodiment, there is provided a suspension element 18, which upholds the rubber band 11. As shown in FIGS. 15, 19, the suspension element 18 is a generally rectangular block, through which there is formed a vertical slit 20, and at the bottom of which there is formed a groove 21. The suspension element 18 is provided in the cassette 1 on the same level as the support arms 10, and is positioned by the cassette left-hand end wall 1C. A ledge 1C' projecting inwardly from the end wall 1C prevents movement of the suspension element 18 upwards beyond the level of the support arms 10. The rubber band 11 passes through the slit 20 formed in the suspension element 18. The rubber band 11 therefore exerts a constant rightwards pressure on the suspension element 18, and the suspension element 18 may contact and apply pressure to the left-hand ends, that is, broads MS2 of the monosheets MS in the cassette 1. However, prior to loading the monosheets MS into the camera C, the suspension element 18 is prevented from contacting the monosheets MS by a Z-shaped withholding lever 17.

Figure 20:
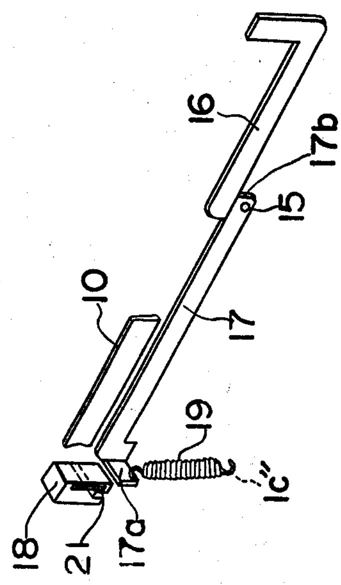

As shown in FIGS. 19, 20, the withholding lever 17 lies forward of the support arm 10 in the cassette 1 and is pivotally mounted on a pin 15, which is fixedly attached to an approximately central point of the inner side of the cassette front wall 1a. The withholding lever 17 comprises a portion **17*b* which lies to the left of the pin 15, and is generally parallel to the support arm 10. At the right-hand end of the portion 17*b* there is formed a small vertical extension, and a lever right-hand portion 16 extends at right-angles thereto. That is, the right-hand portion 16 also lies generally parallel to the support arm 10, but is at a slightly higher lever than the portion 17*b*. The right-hand end 16*a* of the lever portion 16 forms an upwards vertical extension. As shown in FIGS. 15, 18, the complete lever 17 is accommodated in a suitably shaped groove 1*h* formed in the inner surface of the cassette front wall 1*a*. The dimensions of this groove 1*h* are such that a certain amount of rotation of the lever 17 about the pin 15 is permitted. Such rotation is, however, normally prevented by a pin 22, which is fixedly attached to, and projects inwards from the right-hand portion of lever 3 of the upper catch 2, and which projects to above, and contacts the outer end of the lever vertical portion 16*a*, as shown in FIG. 18. In other words, when the catch 2 is closed, the pin 22 prevents upward movement of the lever end 16*a*, and the lever 17 remains generally parallel to the support arm 10. A catch plate 17*a*, which is generally parallel to the cassette end wall 1C, is formed at right angles to the left-hand end of the lever, as shown in FIG. 20. The upper edge of the plate 17*a* normally fits into the groove 21 of the suspension element 18, whereby the suspension element 18 is prevented from being moved rightwards by the force of the rubber band 11. One end of a compression spring 19 is fixedly attached to the plate 17*a*, and the other end thereof is fixedly attached to a point 1C'' of the end wall 1C vertically below the plate 17*a*, The spring 19 exerts a constant force urging the plate 17*a* downwards, out of the groove 21. This force is normally opposed by the pin 22 preventing upward movement of the other end of the withholding lever 17. The configuration in this case, is as shown in the solid lines of FIG. 15**.

However, when the cassette 1 is inerted in the camera entrance C3, the catches 2 are released and the lever 3 pivots anticlockwise, as the same manner described in the 1st embodiment. The pin 22 is therefore moved forwards with the lever 3, and out of contact with the lever right-hand end **16*a*. The spring 19 is therefore now unopposed to rotate the lever 17, and the plate 17*a* is drawn downwards, out of the suspension element groove 21. This removes opposition to the rightwards force of the rubber band 11 passing through the slit 20 of the suspension element 18, and the suspension element 18 is moved rightwards, and contacts and pushes the monosheets MS also rightwards. In other words, the rightwards force of the rubber band 11 is applied at the same time as the cassette door 13** is released, and the monosheets MS are therefore automatically loaded into the camera C, in the same manner as shown with the first embodiment.

Figure 21:
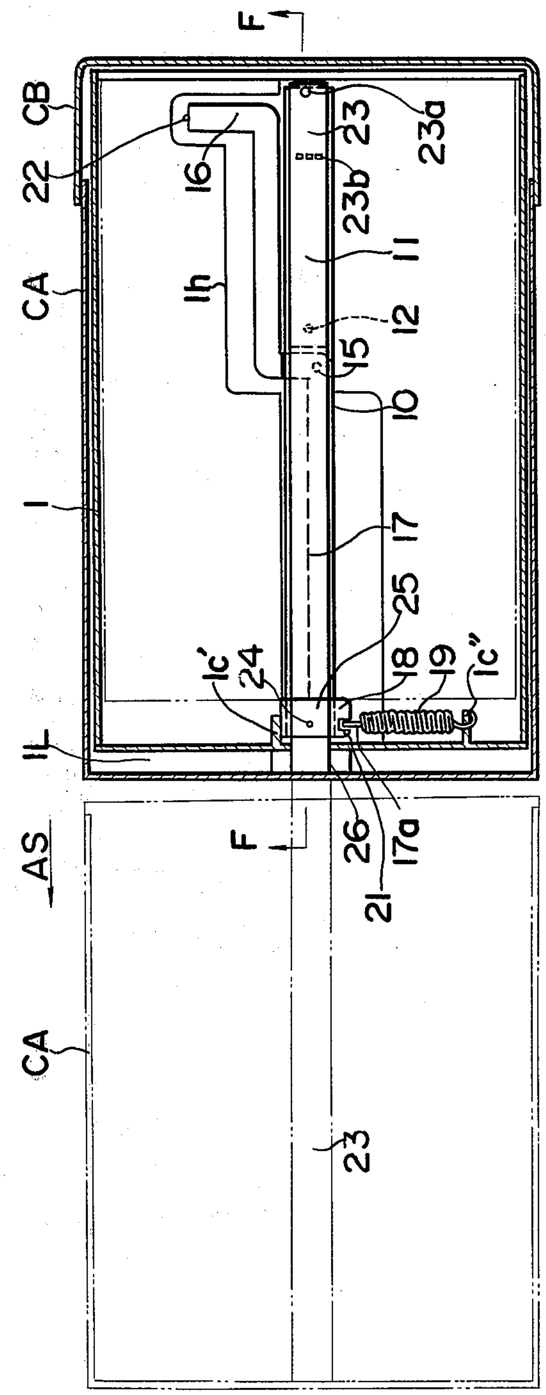
Figure 22:
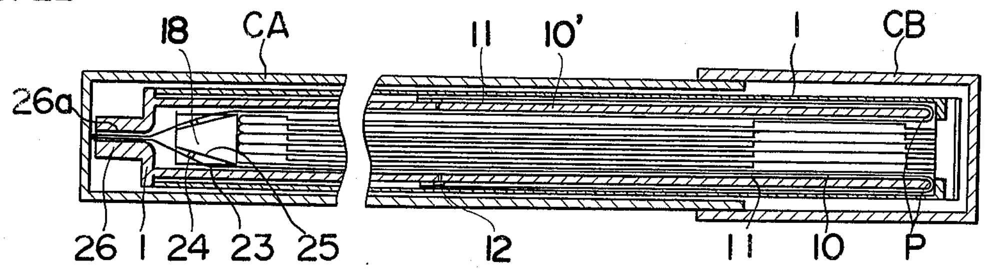
FIG. 22 is a cross-sectional view, on an enlarged scale, taken through the line F—F of FIG. 21.
Figure 23:
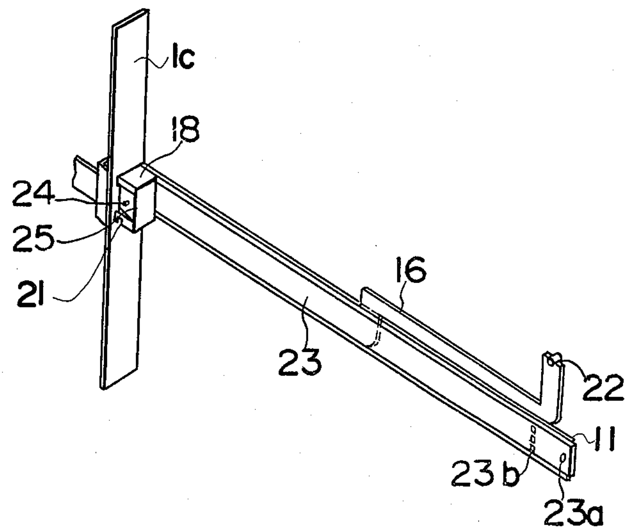
FIG. 23 is a perspective view of a suspension element and elastic means extension employed in the film cassette of FIG. 21.

FIGS. 21 – 23 show a third embodiment of the invention, which is similar to the second embodiment, in that monosheets MS are ejected from the cassette 1 by a rubber band 11, acting through a suspension element 18, which is normally held in a fixed position by a lever 17, and is released when the cassette 1 is inserted into the camera entrance C3. The third embodiment differs from the second embodiment in that, prior to loading monosheets MS, the rubber band 11 is not stretched but extends only to its natural length.

In the third embodiment, the cassette 1 is contained in a case CA and a cap CB, as shown in FIG. 22. The case CA covers the left-hand end and the main body of the cassette 1, and the cap CB covers the right-hand end of the cassette 1 and the right-hand end of the case CA. Both the case CA and cap CB are made of light-proof plastic, or other suitable material. Also, in this embodiment, the rubber band 11 is divided into two portions, which are associated with the support arms 10, 10', respectively. The description will proceed below with reference to the rubber band 11 portion associated with the support arm 10, it being understood that the description is equally applicable to the rubber band 11 portion associated with the support arm 10'.

Referring to FIGS. 21, 23, the rubber band 11 is fixedly attached at one end to a pin 12 located at an approximately central point of the support arm 10, as in the 1st and second embodiments. The rubber band 11 is nautrally long enough to extend, without being stretched, from the pin 12 to just beyond the right-hand end of the support arm 10. The right-hand end of the rubber band 11 is folded around the right-hand end of the support arm 10, and is fixedly attached to one end of a plastic strip 23.

The strip 23 is made of a plastic having high resistance to elongation, and extends from the point of connection with the rubber band 11, shown at P in FIG. 22, to the left-hand wall of the case CA, the left-hand end of the strip 23 bing fixedly attached to this end wall of the case CA.

As shown in FIGS. 22, 23, the strip 23 passes through a slit 25 formed in the suspension element 18. The slot 25 is formed diagonally in the suspension element 18, and extends from the front of the suspension element 18 to the left-hand side thereof, as shown in FIG. 22. The left-hand end wall 1C of the cassette 1 in this embodiment forms a leftwards extension 26, lever with the suspension element 18. A slot **26*a* is formed in the extension 26, to permit passage of the strip 23 therethrough. The inside of the slit 26*a* possesses a pile surface, to further ensure exclusion of light from the interior of the cassette 1.**

The strip 23 passes from the slit 25 in the floating element 18, to the cassette end wall 1C, through the slit **26*a*, and, as described above, the left-hand end thereof is fixedly attached to the inside of the left-hand end of the case CA. A pin 24 is fixedly attached to and projects from the wall of the slot 25. The pin 24 is for engagement of a hole 23*a* formed in the strip 23.**

Referring now to FIGS. 21, 23, the hole **23*a* may be seen to be formed near the right-hand end of the strip 23, that is, near the point of attachment of the strip 23 and rubber band 11. A short distance to the left of the hole 23*a*, there is formed a series of small perforations 23*b*, which permit the strip 23** to be broken at that point, as described below.

The description will continue now in reference to both portions of the rubber band 11, associated with the support arms 10, 10'. In order to load monosheets MS from the cassette 1 into the camera C, the cap CB is removed, and the case CA is withdrawn from around the cassette 1, as shown by the two-dot chain line portion of FIG. 21. When the case CA is thus withdrawn, the strips 23 fixedly attached thereto are drawn through their respective slits 25, and the slit 26. The strips 23 being made of a material having low elongation, the right-hand ends thereof are moved towards the suspension element 18, and the rubber band 11 portions fixedly attached thereto are gradually stretched from the pins 12, 12', around the right-hand ends of the support arms 10, 10', to the vicinity of the suspension element 18. When the case CA has been completely removed from the cassette 1, the holes 23a in the strip 23 come to the locations of the pins 24 in the slits 25. The pins 24 engage the holes **23*a*, and thus prevent the strips 23 from moving back, rightwards within the cassette 1. In other words, the tensile force produced by the stretching of the rubber band 11 portions is now imposed on the suspension element 18, which is therefore urged rightwards. The suspension element 18, however, is prevented from moving rightwards by the engagement of the plate 17*a* in the groove 21 in the base thereof, as described in reference to the second embodiment of the invention. When the holes 23*a* of the strips 23 are thus engaged by the pins 24, the perforated portions 23*b* thereof project to the left of the extension 26, that is, the perforated portions 23*b* are external to the cassette 1. The strips 23 are torn at these perforated portions 23*b*, thus detaching the case CA and left-hand portions of the strips 23 completely from the cassette 1. Next, the cassette 1 is inserted in the entrance C3. This causes the lever 16, 17 to release the suspension element 18, in the manner described in the second embodiment. The suspension element 18 is therefore drawn rightwards by the contraction of the rubber band 11 portions, the loose ends of the strips 23 are drawn rightwards through the slit 26*a*, and the monosheets MS are ejected from the cassette 1** into the camera C.

Figure 24:
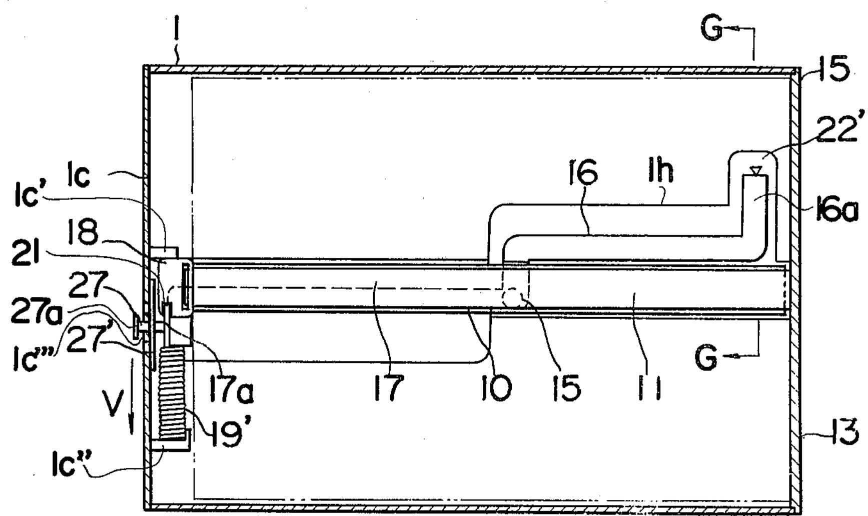
FIG. 24 is a cross-sectional view of a film cassette according to a fourth embodiment of the invention.
Figure 25:
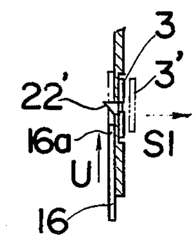
FIG. 25 is a cross-sectional view taken through the line G—G of FIG. 24.
Figure 27:
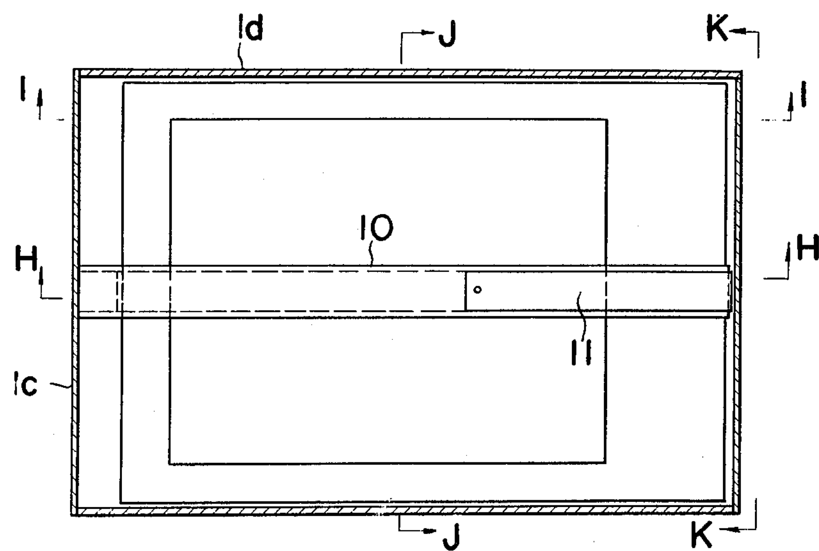
FIG. 27 is a longitudinal cross-sectional view of the film cassette of FIG. 26.

FIGS. 24, 25 show a fourth embodiment of the invention which, while the same in a number of respects when compared with the first, second, and third embodiments, differs therefrom in that the means for releasing a catch 2 is provided on the cassette 1 itself.

Referring to FIG. 24, in the fourth embodiment, the catch plate **17*a*, at the end of the withholding lever 17, is held in the base groove 21 of the suspension element 18 by a vertically aligned expansion spring 19'. The lower end of the expansion spring 19' is fixedly mounted on a small ledge 1C'' projecting inwardly from a point in the lower half of the cassette end wall 1C. The upper end of the expansion spring 19' is attached to the lower edge of the catch plate 17*a*, whereby the catch plate 17*a* is held in the base groove 21 of the suspension element 18, and the lever 16, 17** is held in a generally horizontal alignment.

Still referring to FIG. 24, a small vertical slit 1C'''is formed in the cassette end wall 1C, opposite the catch plate **17*a*. A leftwards extending rod 27 is fixedly attached to the plate 17*a*. The rod 27 passes through and is slideable in the slit 1C'''. The left-hand end of the rod 27 is exterior of the cassette 1, and is provided with a fixedly attached knob 27*a*, to facilitate manipulation thereof. A patch 27' is fixedly mounted on, and around the rod 27, and in close sliding contact with the inner side of the end wall 1C. the patch 27'** is of sufficient size to ensure exclusion of light through the slit *1C'''*, whatever the position of the rod 27 in the slit 1C''. In this fourth embodiment there is employed only one catch 2 to hold the cassette door 13. Also, as shown in FIG. 24, normally, that is when the lever 16, 17 is in a generally horizontal alignment, the lever right-hand end **16*a* does not contact the pin projecting inwardly from the catch lever 3.**

Referring now to FIG. 25, the pin projecting inwardly from the catch lever 3, the above the lever end **16*a*, is a triangular pin 22', which has a slopping surface facing downwards. When the lever end 16*a* is moved upwards, in a manner described below, the tip end thereof contacts, rides on, and pushes against the sloping side of the pin 22', whereby the pin 22' and lever 3 fixedly attached thereto are gradually pushed outwards with respect to the cassette 1, to the position indicated by the dotted line portion of FIG. 25, and the catch lever end 3*a* is moved away from and releases the cassette door 13.**

The camera C used in association with this fourth embodiment need not be provided with catch release pins C51 and springs C52. In order to load monosheets MS from the cassette 1 into the camera C, the cassette 1 is inserted into and through the camera entrance C3, as far as the stoppers C107. The knob **27*a* is then pressed downwards, manually, thus moving the catch plate 17*a* downwards, against the force of the expansion spring 19', and out of the engagement with the suspension element 18, whereby the rightwards urging of the rubber band 11 on the suspension element 18 and monosheets MS is no longer opposed. At the same time, when the catch plate 17***a* is moved downwards the lever 16, 17 is caused to pivot on the pin 15, and the lever end 16*a* is moved upwards, and pushes the pin 22′ and lever 3 outwards; thereby releasing the door 13, as described above. The monosheets MS are therefore loaded from the cassette 1 into the camera 13 by the force of the rubber band 11, and the cassette 1 may be subsequently removed, leaving the monosheets MS in the camera C.

The embodiment of FIGS. 26 – 32 while the same in a number of respects when compared with the embodiments described above, also differs in a number of respects, all of which will become apparent below.

Referring to FIGS. 30, 31, the monosheets MS in the cassette 1 are urged rightwards by the rubber band 11, but are held within the cassette 1 by bands 30, which are fixed within the cassette 1 in a manner described below. The door 13 and catches 2 are therefore unnecessary in this 6th embodiment, and the leading (right-hand) end of the cassette 1 is simply covered by a light-proof cover 28. The cover 28 does not hold the monosheets MS in the cassette 1, and is merely intended to protect the monosheets MS from exposure to light prior to loading. When the monosheets MS are loaded in the camera C, the light-proof cover 28 is broken open, as described in further detail below.

Referring now to FIGS. 26, 31, the bands 30 retaining the monosheets MS are associated with clamp means 29. There are provided two bands 30, and two clamp means 29, the clamp means 29 being formed at the right-hand edge of the cassette back wall 1*b*, as shown in FIG. 26. The described will proceed below in reference to one band 30 and associated clamp means 29, it being understood that the description is equally applicable to the other band 30 and clamp means 29.

As shown in FIG. 31, one end 30*a* of the band 30 is fixedly attached to the inside of the cassette front wall 1*a*. The band 30 passes around the leading edges of the monosheets MS and the other end thereof is clamped in the clamp means 29, which pulls the band tightly against the monosheets MS.

Referring now to the detail drawing of FIG. 31, the clamp means 29 may be seen to comprise independent jointed slide portions 29-1, 29-3, which fits into grooves 1*b*-1, 1*b*-2, and a wedge 1*b*-3 formed in the cassette back wall 1*b*. the groove 1*b*-1 is formed at the extreme righthand edge of the back wall 1*b*. In other words, seen end on, the back wall 1*b* is cut away at the location of the groove 1*b*-1, as shown in FIG. 32. The groove 1*b*-2 is shorter than the groove 1*b*-1, and is formed parallel thereto in the right-hand end of the back wall 1*b*. The groove 1*b*-2 does not extend to the right-hand edge of the back wall 1*b*, but stops short thereof, as shown in FIG. 31. The left-hand ends of the grooves 1*b*-1, 1*b*-2 open into a small gap 1*b*′ fromed in the back wall 1*b*. To the left of the gap 1*b*′, the wall 1*b* forms a small rightwards extending ledge 1*b*-3. The rest of the back wall extends solidly to the end wall 1C. The ledge 1*b*-3 is equal in thickness to the distance between the grooves 1*b*-, 1*b*-2, and is aligned on a line passing between the grooves 1*b*-1, 1*b*-2.

Still referring to FIG. 31, the jointed slide portions 29-1, 29-3 fits into the grooves 1*b*-1, 1*b*-2, and around the ledge l*b*-3, and closes the gap 1*b*′. The jointed slide portions comprise two parallel pieces 29-1, 29-3, which are fixedly, attached to, and joined by a connection piece 29-2, which is at right-angles thereto, and whose length is equal to the thickness of the ledge 1*b*-3. The slide piece 29-1 is positioned outermost with respect to the cassette 1, and is slideable in the groove 1*b*-1 and on the outer side of the ledge 1*b*-3. The right-hand end of the slide piece 29-1 is therefore exposed, and may be contacted by a stipper C100, as shown in FIG. 9. The slide piece 29-3 rides in the inner groove 1b-2 and on the inner side of the ledge 1*b*-3. In other words, the ledge 1*b*-3 lies between the slide pieces 29-1, 29-3. However, prior to loading the monosheets MS into the camera C, only the right-hand end of the ledge 1*b*-3 is covered by the slide pieces 29-1, 29-2, that is, neither the slide piece 29-1, nor the slide piece 29-3 extends over the whole length of the ledge 1*b*-3. Also, in this configuration the right-hand edge of the ledged 1*b*-3 is separated from the connected piece 29-2. In other words it is possible for the slide portion 29*a* to be moved leftwards from the normal position. The dimensions of one, or of both the slide peices 29-1, 29-3, are such that, in all positions of the slide portions, the gap 1*b*′is always closed, whereby exclusion of light from the cassette 1 is ensured.

Still referring to FIG. 31, the other free end 30*b* of the band 30, is packed into, and clamped between the inner side of the slide 29-3 and the inner side of the groove 1*b*-2. In this configuration, the band 30 is held tightly drawn across the ends of the monosheets MS, and the clamps means 29 itself is helf in a rightmost position, due to the presence of the band end 30b packed into the groove 1*b*-2, and pressing against the slide piece 29-3.

The description will continue below in reference to both clamp means 29 and bands 30.

Referring now to FIG. 9, the camera C used in association with this embodiment, is not provided with pins and spring C51, or stoppers C107 in, or adjacent to the entrance 3, but is provided with stoppers C100 at a rear, right-hand portion of the interior of the camera C.

Referring now to FIGS. 9, and 26 to 32, in order to load monosheets MS into the camera C, the cassette 1 is inserted into the camera C, through the entrance C3. There being no stoppers C107, the cassette 1, still containing the monosheets MS held by the bands 30, is moved rightwards into the camera C, until only the left-hand end portion thereof still remains external to the camera C. When the cassette 1 is moved so far rightwards that the leading end thereof comes to the location of the stoppers C100, the slide pieces 29-1 are contacted by the stoppers C100. As the cassette 1 continues to be moved rightwards, the stoppers C100, acting through the slide pieces 29-1, push the slide portions leftwards. When the slide portions 29 have been moved leftwards a sufficient distance, such that the left-hand ends of the slide pieces 29-1, or 29-3, comes against the main portions of the back wall 1b from which the ledges 1*b*-3 project, or that the right-hand ends of the ledges 1*b*-3 contact the connection pieces 29-2, the cassette 1 may not be moved any further distance rightwards. When the slide portions 29 are thus moved leftwards, the slide pieces 29-3 are slid out of the grooves 1*b*-2, whereby the band ends 30 are released and the bands 30 are no longer held against, or restrain the monosheets MS. The force of the rubber band 11 is therefore unopposed, and the monosheets MS are ejected en bloc a short distance out of the cassette 1, the light-proof cover 28 being broken open, and the bands 30 being pushed to the side, as indicated by the two-dot chain line portions of FIG. 31. The monosheets MS are ejected a short distance only from the cassette 1, since the leading end of the cassette 1 is close to the right-hand end of the interior of the camera C. When the cassette C is withdrawn leftwards, out through the entrance C3, the rubber band 11 maintains a rightwards pressure on the monosheets 50 until the right-hand ends of the supports arms 10 come into alignment with the left-hand ends of the monosheets MS. The monosheets MS therefore remain in the camera C, during and after withdrawal of the cassette 1.

FIGS. 33–36 show a sixth embodiment of the invention which is similar to the fifth embodiment in that almost the whole of the cassette 1 is temporarily inserted into the camera C, and which also comprises the suspension element 18, described in reference to the second embodiment.

Referring to FIGS. 35, 36, the withholding lever 16, 17, for preventing the suspension element 18 from being moved rightwards by the rubber band 11, is provided in a suitable groove 1*h'* in the cassette back wall 1*b*, and the catch plate 17*a*, correspondingly, extends at right-angles forwards from the end of the lever portion 17*b*. Also, the lever 16, 17 is normally held in a generally horizontal alignment by a U-shaped sliding lever 31, which is contained in a suitably extended groove portion 1*h''* in the cassette back wall 1*b*. As shown in FIG. 36, the U-shpaed lever 31 is so positioned that the sides thereof are generally horizontal, and one end thereof contacts, and prevents upward movement of, the lever end 16*a*. The other end of the slide lever 31 is connected through a connection piece 31a to a slide portion 29. When, therefore, the cassette 1 containing a required number of monosheets is inserted into the camera C and comes into contact with the stoppers C100, the bands 30 are released, and at the same time the leftwards movement of the slide portion 29 connecting to the connection piece 31*a* causes the slide lever 31 to move leftwards, to the position shown by the dotted line portion of FIG. 33. The lever end 16*a* is therefore disengaged, the lever 16, 17 pivots about the pin 15, and the catch plate 17*a* disengages the groove 21 in the base of the suspension element 18. The rubber band 11 is therefore no longger opposed to urge the suspension element 18 and monosheets MS rightwards, and when the cassette 1 is withdrawn the monosheets MS remain in the camera C, as described above, in reference to the fifth embodiment.

As is clear from the above description, the present invention provides a film cassette which is light and compact, and which permits rapid and automatic loading of monosheets into a camera. Also, with the film cassette of the invention, a camera is not required to hold the cassette itself, but only the monosheets, used for taking photographs. The invention thus offers the advantages that, the film cassettes being lighter and mote compact than conventional cassettes or packs, it is easier to transport a large number of monosheets, that loading action is rapid and easy, and that the film cassettes do not add to the weight of a camera, which is therefore rended easier to manipulate.

What is claimed is:

1. A film cassette for insertion within a photographic camera, said film cassette being of rectangular plate-like configuration, formed of lightproof material, and containing a certain number of film monosheets, said cassette comprising: an opening within one end for extrusion of said monosheets from said film cassette and into the body of the camera, lightproof sealing means normally covering said opening, elastic means carried by said cassette for exerting a biasing force on the ends of said monosheets opposite said opening for causing extrusion of said monosheets from said opening past said sealing means and into the camera body, and releasable catch means carried by said cassette and acting on said sheets for restraining sheet movement against said biasing force to normally prevent said sheets from passing through said opening and being released upon insertion of said cassette into said camera.

2. A film cassette as recited in claim 1, wherein: said sealing means comprises a pivotable door overlying said opening within said one end of said camera and said catch means is mounted on said cassette in operative engagement with said door to normally maintain said door closed but automatically releases said door upon insertion of said cassette into said camera such that the biasing force of said elastic m;eans causes said monosheets during extrusion from said opening to pivot said door from closed to open position.

3. The film cassette as claimed in claim 2, wherein said cassette comprises a plate-like box, a rubber band extends at least along both side walls of said box on the interior thereof and across the end of said monosheets opposite said opening and within respective opposed grooves within the internal sidewall suurfaces of said cassette such that said rubber band does not laterally compress said monosheets when tensioned, and said catch means comprises a flat, generally L-shaped lever having a hooked end which overlies said pivotable cover, the outer wall of one of said sidewalls is recessed, means pivotably mount the end of said lever opposite said hooked end to said cassette sidewall within said recess and said box carries a plate spring within said recess with one end in flexed contact with said lever to the side of said pivot means tending to bias said hooked end into overlying position with respect to said pivotable door, but pivoting of said lever in the opposite direction upon insertion of said cassette within said camera body to the point where means carried by said camera releases said lever and the tensioned rubber band forces extrusion of said monosheets from said cassette into said camera body.

4. The film cassette as claimed in claim 3, wherein the grooves within the sidewalls of said cassette carry cantilever mounted rigid support arms over which respective ends of said rubber band are reversibly stretched.

5. The film cassette as claimed in claim 3, wherein said withholding means comprises a generally Z-shaped lever, said S-shaped lever is pivotably mounted intermediate of its ends to said cassette sidewall at the height of said rubber band and wherein said suspension element comprises a rectangular block including slits which receive said rubber band, one end of said Z-shaped lever releasably engages said block to maintain it out of contact with the ends of said monosheets, a coil spring spring biases said one end of said Z-shaped lever towards a position tending to release said block and said cassette includes camera engageable release means responsive to insertion of said cassette into said camera for engaging the opposite end of said Z-shaped lever to prevent pivoting of said lever about its pivot axis to release said block.

6. A film cassette as recited in claim 1, wherein; said catch means comprises at least one band spanning the interior of said cassette with one end fixed to a wall of said cassette to one side of said monosheets, and clamp means slidably carried by the opposite cassette wall for releasably holding the opposite end of said band to prevent extrusion of said sheets under the biasing force of said elastic means, through said lightproof sealing means.

7. A film cassette as recited in claim 1, wherein said cassette is formed with front, back and end walls and said cassette is formed with front, back and end walls and said elastic means comprises at least one rubber band normally stretched and extending between said monosheets and front, end and back walls of said cassette to exert a constant force directly on said monosheets urging said monosheets towards said opening.

8. A film cassette as recited in claim 1, wherein said cassette includes front, back and end walls said elastic means comprises at least one rubber band normally stretched and extending between said monosheets and front, end and back walls of said cassette, to bias said sheets towards said opening and said cassette further comprises a suspension element, a withholding means normally and a withholding means, which normally holding said suspension element out of pressure contact with said monosheets and in a position to receive the biasing force of said rubber band, said withholding means including means responsive to insertion to said cassette into said camera, to release said suspension element, whereby the tensile force of said rubber band is transmitted directly to said monosheets through said suspension element, for urging said monosheets from said cassette through said opening.

9. A film cassette as recited in claim 1, wherein; said electric means comprises at least one rubber band, and said cassette further comprises extension means operatively coupled to said rubber band for stretching said rubber band and tensioning the same by withdrawal of said extension means from said cassette opening.

* * * * *